UNITED STATES PATENT OFFICE.

PAUL THOMASCHEWSKI, OF VOHWINKEL, NEAR ELBERFELD, GERMANY, ASSIGNOR TO FARBENFABRIKEN VORM. FRIEDR. BAYER & CO., OF ELBERFELD, GERMANY, A CORPORATION OF GERMANY.

YELLOW WOOL-DYE OF THE ANTHRAQUINONE SERIES.

1,076,249.  Specification of Letters Patent.  Patented Oct. 21, 1913.

No Drawing.  Application filed December 6, 1912. Serial No. 735,307.

*To all whom it may concern:*

Be it known that I, PAUL THOMASCHEWSKI, doctor of philosophy, chemist, citizen of the German Empire, residing at Vohwinkel, near Elberfeld, Germany, have invented new and useful Improvements in Yellow Wool-Dye of the Anthraquinone Series, of which the following is a specification.

I have found that new valuable yellow wool dyestuffs distinguished by a remarkable fastness can be obtained by combining the diazo compounds of aminosulfonic acids of anthraisothiazole

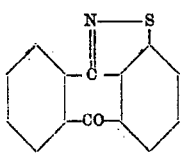

(obtained according to British Letters Patent No. 11931/09) with aliphatic beta-diketones containing the radical $CH_3$—$CO$—$CH_2$—$CO$—, such as aceto-acetic acid ethyl ester, and more specifically with amids of such aliphatic beta-diketones as contain the radical $CH_3$—$CO$—$CH_2$—$CO$—$NH$— such as aceto-acetic acid amid, aceto-acetic acid anilid, etc.

The new dyes are after being dried and pulverized in the shape of their alkaline salts yellow powders soluble in water with a yellow coloration.

In order to illustrate the new process more fully the following example is given, the parts being by weight:—10 parts of the sodium salt of the 4-amino-1-anthraisothiazole-8-sulfonic acid (see British Letters Patent No. 11931/09) are dissolved in 200 parts of concentrated sulfuric acid and diazotized with 3 parts of sodium nitrite. The diazo compound thus obtained is precipitated by diluting the solution with ice water, it is filtered off and is stirred into 500 parts of water containing 6 parts of aceto-acetic acid anilid with the addition of sodium acetate or soda until it shows a slightly alkaline reaction and the formation of the dyestuff is complete. By the addition of common salt it is precipitated and filtered off. The dyestuff having as free acid most probably the formula:

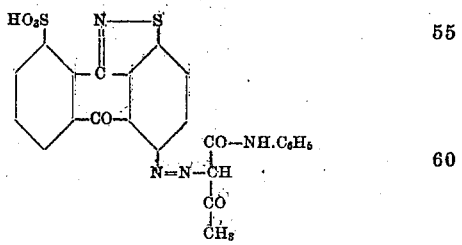

is after being dried and pulverized in the shape of its sodium salt a yellow powder soluble in water with a yellow coloration. It dyes wool from an acid bath in brilliant yellow shades fast to light.

By replacing the aceto-acetic acid anilid by 3.5 parts of the amid or by 4 parts of the ester or by 6.5 parts of ortho-chloro-anilid of the aceto-acetic acid also yellow dyestuffs are obtained distinguished by a good fastness to chromium compounds and to milling. By replacing the alpha-amino-thiazolesulfonic acid by the beta compounds greenish-yellow dyestuffs are obtained.

I claim:—

1. The new dyestuffs being combinations of diazotized amino-anthraisothiazole-sulfonic acids containing the radical:

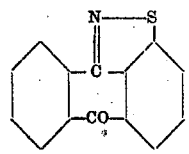

and aliphatic beta-diketones containing the radical $CH_3$—$CO$—$CH_2$—$CO$—, which dyestuffs are after being dried and pulverized in the shape of their alkaline salts yellow powders soluble in water with a yellow coloration; dyeing wool from acid baths fast yellow shades, substantially as described.

2. The new dyestuffs being combinations of diazotized amino-anthraisothiazole-sulfonic acid containing the radical

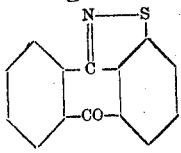

and amids of aliphatic beta-diketones containing the radical $CH_3-CO-CH_2-CO-NH-$, which dyestuffs are after being dried and pulverized in the shape of their alkaline salts yellow powders soluble in water with a yellow coloration; dyeing wool from acid baths fast yellow shades, substantially as described.

3. The new dyestuffs being combinations of diazotized amino-anthraisothiazole-sulfonic acids containing the radical

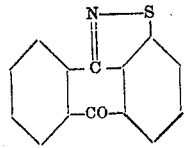

and amids of the structure $CH_3-CO-CH_2-CO-NHR$, where R is an aromatic radical, which dyestuffs are after being dried and pulverized in the shape of their alkaline salts yellow powders soluble in water with a yellow coloration; dyeing wool from acid baths fast yellow shades; substantially as described.

4. The new dyestuff having as free acid most probably the formula:

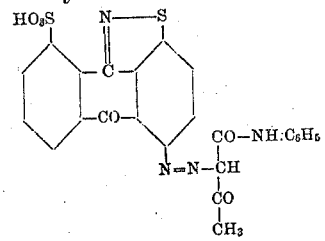

which is after being dried and pulverized in the shape of its sodium salt a yellow powder soluble in water with a yellow coloration; and dyeing wool from an acid bath yellow shades fast to light, substantially as described.

In testimony whereof I have hereunto set my hand in the presence of two subscribing witnesses.

PAUL THOMASCHEWSKI. [L. S.]

Witnesses:
ALBERT NUFER,
HELEN NUFER.